March 12, 1968     E. G. MOSHIER     3,372,629
PHOTOCOPY DEVICE
Filed April 15, 1965     2 Sheets-Sheet 2
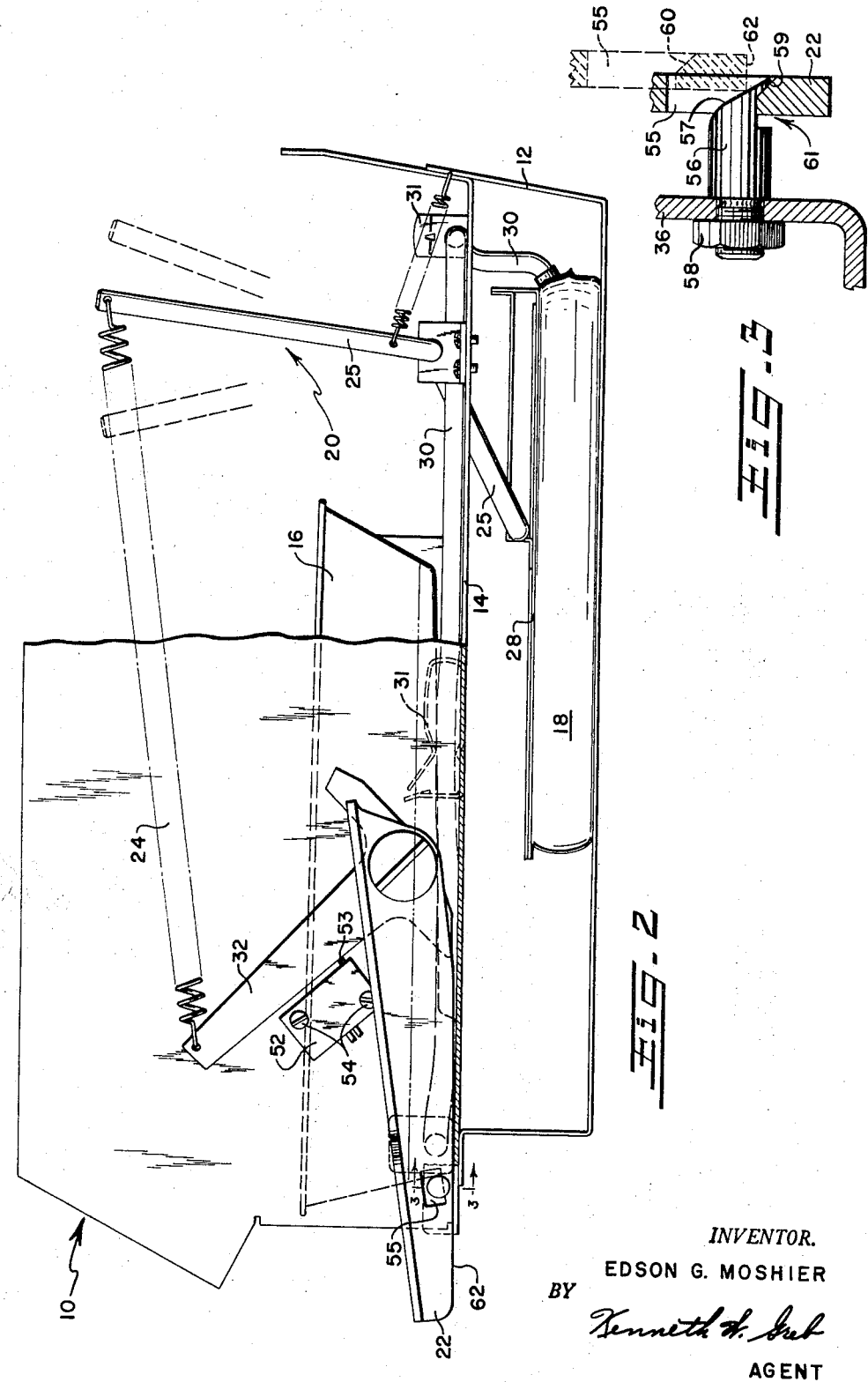
INVENTOR.
EDSON G. MOSHIER
BY
AGENT United States Patent Office 3,372,629
Patented Mar. 12, 1968

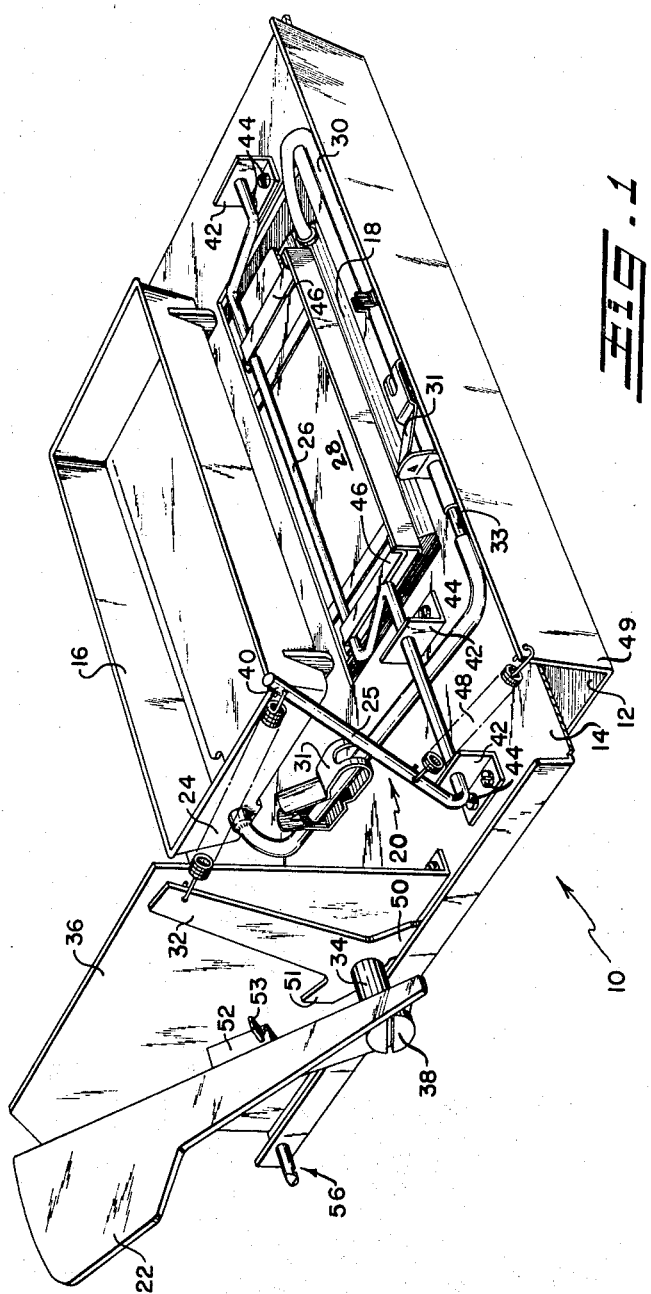

3,372,629
PHOTOCOPY DEVICE
Edson G. Moshier, Jamesville, N.Y., assignor to SCM Corporation, New York, N.Y., a corporation of New York
Filed Apr. 15, 1965, Ser. No. 448,486
2 Claims. (Cl. 95—89)

ABSTRACT OF THE DISCLOSURE

A photocopy machine having a chemical solution handling device for transferring the solution from a storage container to a processing tray and returning the solution back to the container. The device includes a handle operated spring system for biasing a pressure plate against a flexible container to force the solution into the tray at a predetermined rate.

This invention relates to photocopy machines which use chemical solutions and more particularly concerns the automatic handling of the solution.

In order to reduce the rate of oxidation, the chemical solution preferably is returned from a processing tray to a closed container when the solution is not in use. This is time consuming when it is done manually by the operator and quite often results in spillage which can stain or damage clothes. Furthermore, it is desirable to retain a reservoir of chemical solution in the container after the tray has been sufficiently filled to strengthen the solution when it is returned to the container after each usage.

The present invention overcomes the problem of manual handling of the chemical by providing a self-contained flexible chemical container with mechanical means for transferring the chemical from the container to the processing tray. The flexible container is disposed at a level lower than that of the processing tray and is connected to the processing tray by a flexible tube arrangement. A pressure plate overlies the container and has an actuating handle through the intermediary of a crank and a spring operatively connected thereto. When the actuating handle is depressed, the spring is placed under tension and, acting on the crank, forces the pressure plate down against the container thus squeezing the chemical through the flexible tube and up into the processing tray. The actuating handle may be latched in an actuated position in which the spring provides a continued force on the container until a balanced condition is reached in which the tray is sufficiently filled with the chemical solution. When the handle is unlatched and returned to its normal inactive position, the force on the container is removed and the chemical flows by gravity into the container.

Some photocopy machines use a mechanical means for transferring the chemical from a flexible container to the processing tray. Most of these machines employ a shut off means on the connector tube so the tube may be disconnected from the processing tray without fear of spillage when the chemical becomes weak and the container needs replacing. However, these machines do not disclose a safety means provided by the present invention. For example, the U.S. Patent 2,989,913 to E. Kron et al. on June 29, 1961 discloses a flexible chemical container that is disposed at a level that is lower than the developing tray and is connected to the tray by a tube for the purpose of transferring the chemical to the processing tray when the container is squeezed by a plate and crank arrangement. But unlike the present invention, however, the crank is driven by a motor, and no shut off means is disclosed for the container or tube. If the Kron et al. machine does not use a shut off means, then this machine does not disclose the combination of safety features as that of the present invention. If the Kron et al. machine does use a shut off means, and if the operator forgets to release the shut off means, a condition exists where the container is being squeezed under power while the chemical is restricted from leaving the container. This condition should cause the container or the tube to burst resulting in possible damage to the operator as well as costly machine repair.

A U.S. Patent No. 2,762,281 issued to H. Kleinstra on Sept. 11, 1956 discloses a photocopy machine that has a chemical container mounted to its side for the purpose of returning the chemical from the processing tray to the container by gravity, but unlike the present invention the container in the Kleinstra structure is not of a flexible material and the chemical is also transferred to the processing tray from the container by gravity by swiveling the container to an alternate position.

The concept of a spring urged pressure plate to force the chemical from a flexible container into the processing is disclosed in a U.S. Patent No. 3,145,635 issued to J. Gugelot et al. on Aug. 25, 1964, wherein the squeezing operation begins when the machine cover is raised to an opened position and wherein the chemical returns to the container by gravity when the machine cover is lowered to the closed position. The tension spring disclosed in the Gugelot et al. structure and the tension spring in the present invention both supply the energy to squeeze their respective flexible containers; however, the tension spring in the Gugelot et al. structure is put into condition (extended) when the actuating member (cover) is moved to its disabled or closed position and is kept in that condition until the cover is raised, whereas the tension spring in the present invention is put into condition when the actuating member (handle) is moved to its active position and is at its free length when the actuating member is in its inactive position. Moreover, the pressure plate of the Gugelot et al. structure is moved from its active position to its inactive position by a rigid lever while the pressure plate of the present invention is moved from its active position to its inactive position through the intermediary of a second tension spring.

Another difference between the Gugelot et al. mechanism and the present invention is that the actuating member of the Gugelot et al. structure is dependent upon a system of direct levers to transmit its motion to the pressure plate crank whereas in the present invention the actuating member is dependent only upon a yieldable tension spring to impart the motion to the pressure plate crank, thereby providing a more economical structure.

The main object of this invention is to provide a photocopy machine that employs a self-contained chemical container wherein the chemical solution may be transferred to and from the processing tray automatically.

A further object of this invention is to provide a photocopy machine with a mechanism for transferring the chemical to and from the processing tray that is of a more economical construction.

Another object of this invention is to provide a photocopy machine that eliminates the possibility of operation without the processing tray having sufficient chemical therein.

Another object of this invention is to provide a photocopy machine that has an actuating member that may be depressed and latched, and an energy storing member that is put into condition by the depression of the actuating member so as to cause continuous filling of the processing tray with the chemical until a sufficient level is obtained.

Another object of the present invention is to provide a photocopy machine having a spring driven pressure plate which is completely safe if the handle is operated while the shut off means is closed, thus tending to compress the solution in the container, the spring that drives the pressure plate will be extended and remain extended until the condition is discovered and corrected.

Further novel features and other objects of this invention will become apparent from the following detailed description, discussion and the appended claims taken in conjunction with the accompanying drawings showing a preferred embodiment in which:

FIGURE 1 is a rear perspective view of an embodiment of the invention;

FIGURE 2 is a left side elevational view of FIGURE 1 showing the actuating member in the latched position with the crank handle illustrated in three positions during the processing tray filling operation; and FIGURE 3 is a sectional view on line 3—3 of FIGURE 2.

Referring now to the drawing, FIGURE 1 illustrates a photocopy machine 10 having a frame 12, a bed plate 14, a processing tray 16, a flexible chemical container 18, and an energy storing mechanism 20 constructed in accordance with the principles of the present invention, for forcing the chemical from its container 18 to the processing tray 16 through a flexible connecting tube 30. The novel energy storing mechanism 20 includes an actuating handle 22 that conditions a heavy tension spring 24 to effect a force applied to the container 18 by a crank 26 and a pressure plate 28.

The container 18 is disposed at a lower level than that of the processing tray 16 and has a flexible tube 30 that connects the container 18 with the processing tray 16 and is separated by a hollow spacer 33 which provides a means for transferring the chemical from one to the other. Two clips 31 are positioned on the tube 30 for providing shut off means for the two tube sections so that the container 18 may be removed and replaced without fear of spillage.

The actuating handle 22 and a stop lever 32 are rigidly mounted to each other by a sleeve 34 that is brazed to each and the assembly is pivotally mounted to upstanding frame member 36 by a shoulder screw 38 and a nut (not shown). The heavy tension spring 24 is connected at its left end to the upper end of stop lever 32 and is connected at its other end to the upper end 40 of the crank handle 25.

The crank 26 is formed such that it is pivotally supported by three bearing supports 42 that are rigidly mounted to the base plate 14 by screws 44. The U-shaped portion of the crank 26 extends transversely over the surface of the pressure plate 28 that in turn overlies the container 18 and the U-shaped portion supports the pressure plate 28 by extending through two guide openings that are created by two formed straps 46 that are rigidly mounted on the pressure plate 28. The two guide openings also provide a means for sliding the pressure plate 28 to the front of the machine for better access to the container 18 when replacement of the container 18 is necessary.

A return spring 48 which is connected between the upward wall 49 of the frame 12 and the crank handle 25 biases the crank 26 clockwise about its pivot axis and holds the energy storing mechanism 20 in the normally inactive position as shown in FIGURE 1.

The stop lever 32 has a lower extension 50 which abuts the base plate 14 and limits the actuating handle 22 in its inactive extreme clockwise position while another stop lever lower extension 51 abuts the base plate 14 to limit the degree of depression of the actuating handle 22.

A machine switch 52 which when energized starts the operation of any conventional motor driven exposure apparatus (not shown) is rigidly mounted to upstanding frame member 36 by screws 54 (FIG. 2) in such a position whereby the switch button 53 will be depressed by stop lever 32 to actuate the switch 52 and machine motor (not shown) when the actuating handle 22 is depressed to its operative position.

When the actuating handle 22 is depressed, the tension spring 24, which is the energy storing member of the energy storing mechanism 20, is conditioned to apply a force on the crank 26 that is opposite in direction and of a greater force than the return spring 48. This force causes the crank 26 to push the pressure plate 28 down against the container 18. The actuating handle 22 has a rectangular shaped aperture 55 for cooperation with a grooved shoulder pin 56 for latching. The pin 56 is rigidly mounted in upstanding frame member 36 (FIG. 3) by means of the pin shoulder and a nut 58 and is beveled on its outward face 57. The pin groove 61 is in the underside of the pin periphery near the beveled face 57 and has its outmost edge 59 also beveled. The lower defining edge 60 of the actuating handle aperture 55 is also beveled approximately one-half the width of the defining edge 60 so as to cooperate with the beveled edge 59 of the pin groove 61.

When the depressed actuating handle 22 is to be latched, the inward end of the actuating handle bottom edge 62 contacts the beveled face 57 of the pin 56 and the actuating handle 22 is cammed outward as well as downward until aperture 55 is in an aligned position with the pin 56. The tendency of the actuating handle 22 is to be restored to its normal rotational plane perpendicular to its pivot axis, and is due to the elasticity of the actuating handle 22 and the upstanding frame member 36, causes the aperture 55 to circumscribe the pin 56.

The energy that is stored within the tension spring 24 provides a continuous but relatively slow rotation of the crank 26 to squeeze the container 18 and fill the processing tray 16 with the chemical and without any further assistance from the operator. The tension of spring 24 will continue to squeeze the container until the force applied by spring 24 just balances the forces exerted by the container 18 against the plate 28 and by the spring 48 opposing spring 24. It can now be seen that if a new flexible container is placed in the machine and if either of the shut off means (clips 31) is mistakenly left closed when the actuating handle 22 is depressed to its downward latched position, the tension spring 24 yields and prevents any danger to the operator or any damage to the machine. When the actuating handle 22 is released, the tension spring 24 biases the actuating handle 22 upward and the two mating beveled surfaces 59 and 60 of the pin 56 and the aperture 55 respectively insure proper alignment and positive latching of the actuating handle 22.

The machine switch 52 (FIG. 2) is actuated by the stop lever 32 just before the actuating handle 22 is latched and the spring rate of the tension spring 24 is such that the processing tray 16 is sufficiently filled by the time the operator has completed the exposure operation and is ready for the developing or processing operation.

When the operator is finished copying, the actuating handle 22 is depressed to its stop, pulled to the side, and the energy storing mechanism is allowed to return to its inoperative position by the two tension springs 24 and 48 which lifts the pressure plate 28 and allows the chemical to flow by gravity back into its container 18.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. A device for photocopy machines comprising:
   (a) a framework;
   (b) a flexible chemical solution container for supplying a chemical solution to and for receiving the solution from the machine supported by said framework;
   (c) a tray for holding the solution, which tray is supported by said framework at a level above said container;
   (d) a flexible solution transmitting tube connecting said container to said tray;
   (e) a plate movable from a normally disabled position to an enabled position in which it squeezes said container;
   (f) a handle movable from a first position to a second position; and
   (g) an energy storing means operatively connecting said handle to said plate comprising:
      (1) a member connected to said plate;
      (2) a first spring connecting said handle to said member to apply a force on said plate to transfer the solution from said container to said tray when said handle is moved to the second position; and
      (3) a second spring connected to said member for opposing the force of said first spring to effect the force on said plate to determine the rate of transferring the solution from said container to said tray and for returning said member and said plate to the disabled position.

2. A device as defined in claim 1 further comprising a means for locking said handle in said second position to cause said energy storing means to continue to exert a force on said container.

References Cited

UNITED STATES PATENTS

| | | | |
|---|---|---|---|
| 2,903,954 | 9/1959 | Schwienbacher | 95—89 |
| 2,989,913 | 6/1961 | Kron et al. | 95—89 |
| 3,145,635 | 8/1964 | Gugelot et al. | 95—89 |
| 3,165,046 | 1/1965 | Land et al. | 95—89 |

FOREIGN PATENTS

| | | |
|---|---|---|
| 1,294,806 | 4/1962 | France. |
| 1,335,703 | 7/1963 | France. |
| 367,391 | 3/1963 | Switzerland. |

NORTON ANSHER, *Primary Examiner.*

F. L. BRAUN, *Assistant Examiner.*